United States Patent
Marks et al.

(10) Patent No.: US 9,535,866 B2
(45) Date of Patent: Jan. 3, 2017

(54) ASYMMETRIC STORAGE DEVICE WIDE LINK

(75) Inventors: Kevin Marks, Georgetown, TX (US); Gary B. Kotzur, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 1073 days.

(21) Appl. No.: 13/161,033

(22) Filed: Jun. 15, 2011

(65) Prior Publication Data

US 2012/0324146 A1    Dec. 20, 2012

(51) Int. Cl.
*G06F 3/00* (2006.01)
*G06F 13/38* (2006.01)
*G06F 3/06* (2006.01)

(52) U.S. Cl.
CPC .......... *G06F 13/385* (2013.01); *G06F 3/0613* (2013.01); *G06F 3/0635* (2013.01); *G06F 2213/0028* (2013.01)

(58) Field of Classification Search
CPC ...... G06F 3/0635; G06F 3/061; G06F 3/0613; G06F 13/385; G06F 2213/0028
USPC .......................................................... 710/74
See application file for complete search history.

(56) References Cited

U.S. PATENT DOCUMENTS

| | | | |
|---|---|---|---|
| 7,913,023 B2 | 3/2011 | Johnson et al. | |
| 7,913,037 B2 | 3/2011 | Nakajima et al. | |
| 2006/0136666 A1* | 6/2006 | Pang et al. | 711/114 |
| 2007/0028062 A1 | 2/2007 | Radhakrishnan et al. | |
| 2011/0191644 A1* | 8/2011 | Oldfield et al. | 714/704 |
| 2013/0013828 A1* | 1/2013 | Pang et al. | 710/74 |
| 2013/0080829 A1* | 3/2013 | Colline | 714/6.22 |

* cited by examiner

*Primary Examiner* — Ernest Unelus
(74) *Attorney, Agent, or Firm* — Terrile, Cannatti, Chambers & Holland, LLP; Robert W. Holland

(57) ABSTRACT

A wide link communicates information between a storage enclosure having plural storage devices and an information handling system by selectively configuring upstream and downstream paths of narrow links to communicate in the same direction. A link load analyzer detects predetermined conditions, such as over utilization or under utilization of narrow link capacity, which initiates a re-configuration of the direction of information through a path of a narrow link. A master link manager configures a narrow link path to manage communication of configuration information for one or more narrow link paths configured to communicate in a direction.

19 Claims, 2 Drawing Sheets

ASYMMETRIC STORAGE DEVICE WIDE LINK

BACKGROUND OF THE INVENTION

Field of the Invention

The present invention relates in general to the field of information handling system communication with storage devices, and more particularly to an asymmetric storage device wide link.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Effective use of information handling systems typically requires ready access to storage systems for writing and reading information. Generally, storage systems have multiple storage devices to provide redundancy that prevents information loss in the event a particular storage device experiences a failure. For example, storage devices are assembled in storage enclosures supported by a common backplane. The storage devices coordinate communication with other devices that are external to the backplane by communicating through an expander block, such as an SAS Expander Block Wide Link. For example, a typical SAS Expander Block Wide Link connects with each storage device through the backplane and selectively provides access to each storage device through four narrow serial links that act as a single wide link. Each narrow link has a transmit and receive direction so that a storage device interfaced with a narrow link through the expander block can send and receive information. SAS Expander Block connectors can form daisy chain connections so that a series of storage enclosure systems interface through a common set of connectors. Since individual storage devices are typically accessed intermittently, a single wide link connector can typically support a large number of storage devices under normal operating conditions without having excessive delays due to communication channel congestion across a wide link. However, when information technology administrators assemble storage systems, anticipated storage access impacts the number of storage devices that can efficiently be managed through a wide link.

Assembly of plural narrow links into a wide link connector provides symmetrical bandwidth through the wide link because each serial narrow link has a transmit and a receive path that each operate at the same negotiated link speed. In many application environments, the ratio of reads to writes is asymmetric in nature as different tasks call for retrieving or storing information in spurts. An SAS wide link connector allows for aggregation of multiple narrow links to allow four-by link bandwidth up and down, however, in most storage system enclosure designs the total bandwidth that each storage device can consume at any given time is far greater than the bandwidth available through all four narrow links of the wide link connector. Variable bandwidth consumption is especially apparent with solid state drive (SSD) storage devices that have become available as an alternative to hard disk drive (HHD) storage devices. SSD devices tend to have asymmetric read and write behaviors with read performance typically better than write performance. As a result, during normal operations, one-half of available bandwidth through the wide link connector is often underutilized relative to the other half of available bandwidth.

SUMMARY OF THE INVENTION

Therefore a need has arisen for a system and method which supports asymmetrical usage of serial link paths through a storage system wide link connector.

In accordance with the present invention, a system and method are provided which substantially reduce the disadvantages and problems associated with previous methods and systems for communicating with storage devices through a storage system wide link connector. Narrow links within a wide link are selectively re-configured so that the capacity of the wide link to communicate information in a particular direction between an information handling system and storage enclosure adjusts asymmetrically in response to the load of information communicated in each direction through the wide link.

More specifically, an information handling system storage controller, such as a RAID controller, accesses a storage enclosure having plural storage devices through a SAS wide link having plural SAS narrow links disposed in an SAS expander block. One or more of the SAS narrow links have bi-directional communication paths so that both paths of a narrow link unidirectionally communicate information in the same direction. A bi-directional link manager of the SAS expander block enclosure manager selectively reverses the direction of information communication through the wide link to adjust upstream and downstream bandwidth according to the utilization of narrow links. A link load analyzer monitors traffic through the wide link to detect utilization thresholds that initiate reversal of the direction of a narrow link path, such as utilization of a narrow link path that exceeds an upper level or falls below a lower level. A master link manager coordinates reversal of a narrow link path by providing serial link management for multiple narrow link paths through a common narrow link path master link.

The present invention provides a number of important technical advantages. One example of an important technical advantage is that data paths through a storage system wide link connector support bi-directional communication for asymmetrical bandwidth allocation based upon storage system performance. Links are selectively allocated to communicate upstream or downstream for improved overall utilization of available bandwidth by the storage system. As the volume of information communicated through a wide link shifts between upstream and downstream directions, links are selectively assigned a direction for communication to adjust the overall balance of bandwidth. Balancing available upstream and downstream bandwidth according to system usage reduces congestion, improves information flow and provides a more rapid storage system response.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Variable bandwidth is provided for communication between an information handling system and storage enclosure through an SAS wide link by selectively re-configuring the direction of information communication through narrow link paths of the wide link. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
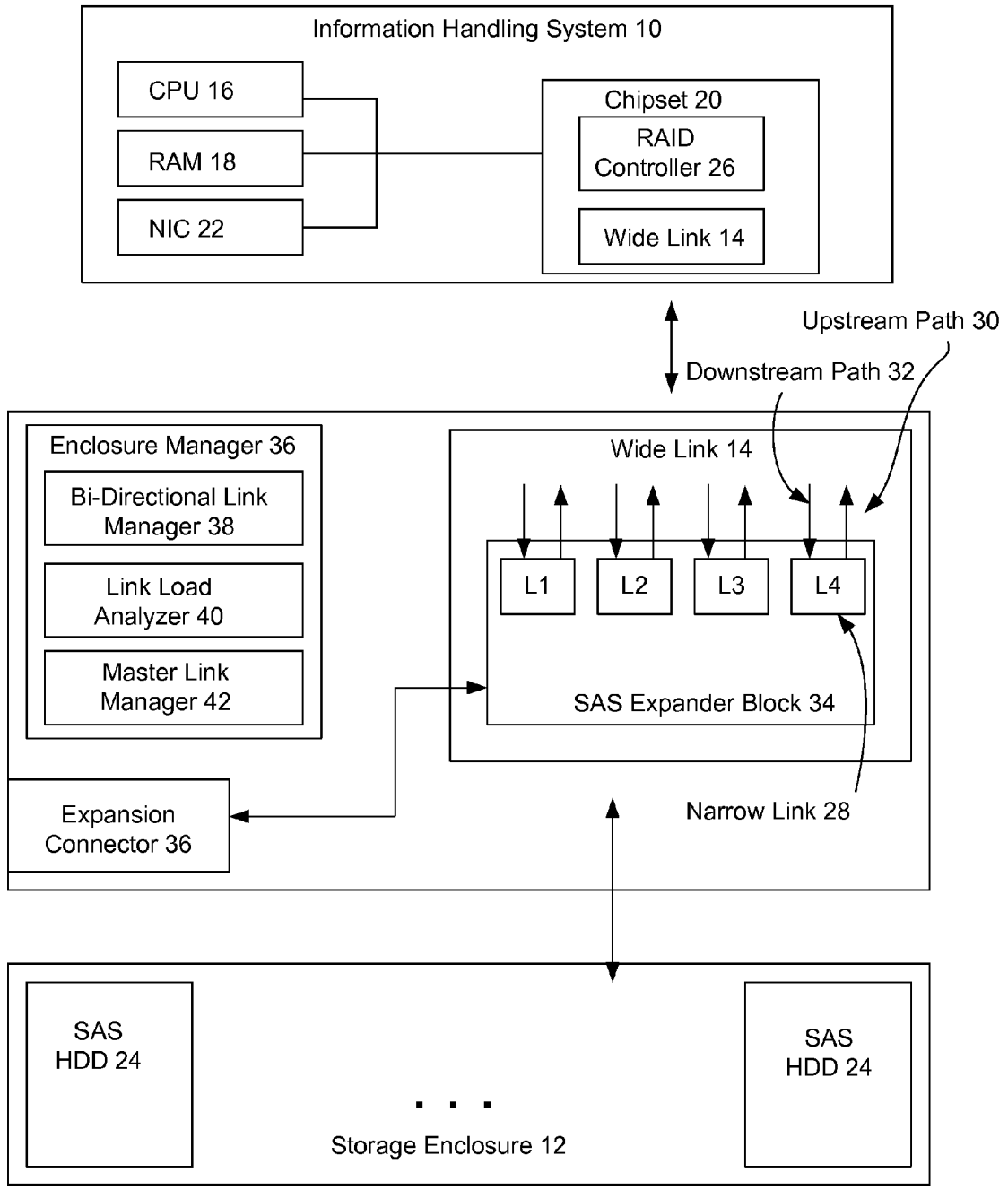
FIG. 1 depicts a block diagram of an information handling system configured to communicate with a storage enclosure through a SAS wide link having adjustable upstream and downstream bandwidth.

Referring now to FIG. 1, a block diagram depicts an information handling system 10 configured to communicate with a storage enclosure 12 through a SAS wide link 14 having adjustable upstream and downstream bandwidth. Information handling system 10 has an application running on processing components, such as a CPU 16, RAM 18, Chipset 20 and NIC 22, that hosts access to information stored on plural storage devices 24 of storage enclosure 12, such as hard disk drives and/or solid state drives. For example, a RAID controller 26 responds to information requests received from a network through NIC 22 by writing or reading information at storage enclosure 12 through wide link 14 using the SAS protocol.

Wide link 14 has a single connector with four narrow links 28. Each narrow link 28 communicates with the serial SAS protocol using an upstream path 30 from the storage devices 24 to information handling system 10 and a downstream path 32 from information handling system 10 to the storage devices 24. An SAS expander block 34 is essentially a cross bar switch or controller multiplexor that selectively interfaces narrow links 28 with storage devices 24 under the management of an enclosure manager 36. Under normal operations with a standard SAS configuration, each narrow link 28 pair of serial paths 30 and 32 supports access to a single storage device 24 at a time and SAS expander block 34 manages accesses by selectively interfacing a narrow link to a selected storage device 24 according to instructions from enclosure manager 36 and RAID controller 26. Although the example embodiment depicts a wide link 14 having four narrow links, in alternative embodiments various numbers of narrow links may be used. In addition, expander block 34 supports access to additional storage enclosures 12 through an expansion connection 36. The total number of narrow links 28, storage devices 24 and wide links 14 may vary as desired to match an anticipated workload for storage accesses.

Load across wide link 14 can vary significantly between read and write operations. During heavy read or write loads, conventional SAS operation does not fully use available bandwidth across all narrow link paths, however, bi-directional communication is used to coordinate communications across serial links of each narrow link 28. In order to more efficiently use bandwidth of link 14, a bi-directional link manager 38 selectively reverses information flow at one or more paths. For example, during loads heavy on reads from storage enclosure 12, bi-directional link manager 38 reverses the direction of information flow through a downstream path so that information travels upstream to provide additional bandwidth that supports information reads. A link load analyzer 40 analyzes the load across wide link 14 to detect thresholds for reversing the direction of information flow at one or more narrow links 28. A master link manager provides shared bi-directional management information for narrow links 28 in which both paths travel in a common direction.

Wide link 14 operates as a standard SAS wide link interface unless an identifier is exchanged with an information handling system that indicates dynamic asymmetric links are supported by both wide link 14 and information handling system 10. Bi-directional link manager 38 exchanges the identifier and supports primitives that provide backchannel communications for state machines of physical interfaces during asymmetric communication of information through wide link 14. For example, SAS OOB signaling provides conventional speed negotiation at a serial SAS link, however, supporting a reverse direction of information flow uses a similar primitive that is not defined by SAS. The non-SAS standard primitive is sent through a multiplexed master link defined by master link manager 42 and forwarded from the multiplexed master link to the physical interface having a reversed information flow. Master link manager 42 maintains at least one path of one narrow link in each direction to ensure proper flow of control information for the physical interfaces and defines a multiplexed master link for each narrow link path having a reversed information flow.

In operation, at power up or other initialization, wide link 14 enters an initial state, such as a standard SAS symmetrical configuration. Link load analyzer 40 monitors link utilization of narrow links 28 within wide link 12, such as by using SAS defined counters over a defined period of time, to determine an appropriate ratio of upstream and downstream paths. Based upon an analysis of information flow across the paths, bi-directional link manger 38 elects one or more of the narrow link paths as master links that have one direction of information flow. The master links provide multiplexed control information for multiple links, such as state machine information for physical interfaces that have reversed information flow. In the event of multiple master links, each reversed path has a master link assigned to it for negotiating control information.

Once master links are defined for each narrow link path having a reversed direction flow, physical interfaces of the wide link reconfigure the selected narrow link paths to reverse the direction of information transmission. All links are then reset with the selected direction using the SAS OOB sequence. Until master links have completed OOB and multiplexing setup, the unidirectional links will continue OOB COMINIT as with standard SAS where a physical interface is not receiving a COMINIT. After completing OOB, master links perform multiplexing setup link position training based upon the narrow link paths assigned to each master link. After completing multiplexing setup, the multiplexed links send information received in each multiplex position to the physical interface that corresponds to each position so that communication of backchannel information allows unidirectional narrow paths to operate. Using the newly defined OOB-like primitive, a receiving physical interface transmits the detection of OOB signals, such as COMINIT_DETECTED in response to a COMINIT signal, so that each link physical interface issues a ready signal. For each physical interface that reaches a ready state, a SAS PHY ENABLE is sent to the PM port layer to grow the width of the link so that enclosure manager 36 can establish a link for communicating information. Utilization of links is periodically evaluated to determine if one or more links should reverse information flow direction.

In the event that an identify frame sent between a wide link and an information handling system does not indicate that availability of asymmetric links in wide link 14, then standard SAS symmetric wide link communication is performed. If an identify link is exchanged between information handling system 10 and wide link 14, minor hardware modifications help to manage information flow reversal at one or more links. For example, buffers provide flow control to handle multiple connections over multiplexed links and to aid ports that receive information in a direction the opposite of what is intended for a narrow link path. The buffers fifo frames and wide link 14 manages and limits sending ready signals to prevent buffer overflows. If a receiver has a reverse flow loss of synchronization, a COMINIT_DETECTED primitive sent on a backchannel causes a new link reset sequence. If a master link has a loss of synchronization, then all links sharing the master link to multiplex management information will automatically receive the primitive to reset each managed link.

Figure 2:
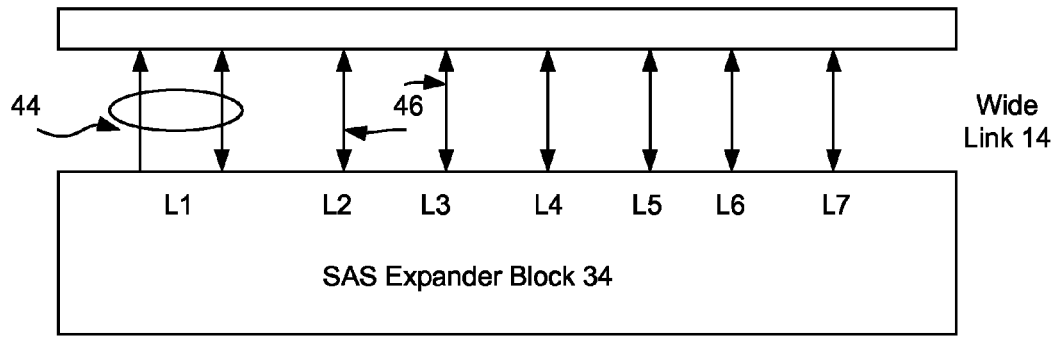
FIG. 2 depicts an example embodiment of a SAS wide link having a symmetrical WL1-4× form factor but adapted to have operate as an asymmetrical WL-7× wide link.

Referring now to FIG. 2, an example embodiment depicts a SAS wide link having a symmetrical WL1-4x form factor but adapted to operate as an asymmetrical WL-7x wide link. One narrow link 28 has a conventional bi-directional serial link 44 in which each path communicates in one direction only. The remaining three narrow links 28 have serial link pairs 46 in which each pair is capable of transmitting in both directions so that the narrow link can become unidirectional. Management information for a unidirectional narrow link is multiplexed through the bidirectional link 44. In instances where information flow is largely in one direction, a total of seven narrow link paths are available to transmit information asymmetrically in that direction.

Figure 3:
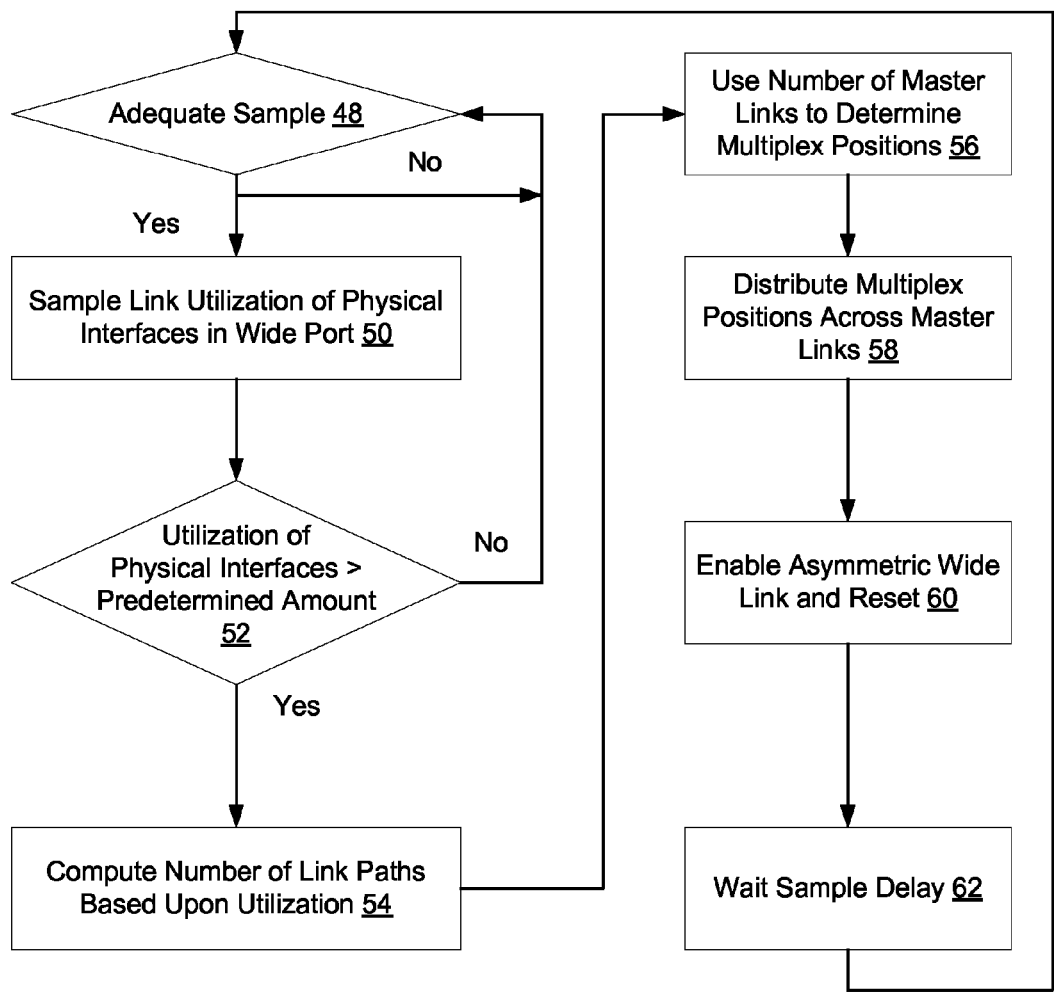
FIG. 3 depicts a flow diagram of a process for communicating information between an information handling system and storage enclosure through a SAS wide link having adjustable upstream and downstream bandwidth.

Referring now to FIG. 3, a flow diagram of a process for communicating information between an information handling system and storage enclosure through a SAS wide link having adjustable upstream and downstream bandwidth. At step 48, a determination is made of whether adequate counting of information flow exists to support an analysis of path direction workload. If not, a delay occurs until enough workload counting information exists. Once enough workload counting information exists, the process continues to step 50 to sample link utilization of physical interfaces of the wide link. At step 52, a determination is made of whether utilization of all physical interfaces in either a transmit or receive direction is greater than a predetermined amount, such as 95%. If utilization is below the threshold, the process repeats at step 48 to continue monitoring utilization. If a utilization threshold is met at step 52, the process continues to step 54 to compute the required number of links that should reverse direction of information flow to obtain a desired utilization threshold. For example a comparison of upstream utilization and downstream utilization is made to obtain a desired overall utilization ratio. The direction having lower utilization is analyzed to determine how many of those underutilized links can switch direction without overloading paths in the lower utilization direction. In one example embodiment, if utilization on an upstream path is 95%, and all utilization of downstream paths is below 35%, then two downstream paths can switch direction without impacting the flow of information downstream. The two remaining downstream paths share master link duty for upstream communication of information on paths that have switched direction.

Once the number of paths to switch direction and the number of master links is determined, then at step 56 the number of multiplexed positions needed for the new configuration of links is determined. For instances, in the above example embodiment of a 4x wide link, 6 multiplexed positions are needed. At step 58, the multiplex positions are distributed across master links, such as by assigning 3 multiplexed positions to each master link in the example embodiment. At step 60, the asymmetric wide link enable is set and a wide link reset sequence is initiated to reset the wide link with the determined asymmetric configuration. Once the newly determined asymmetric configuration is initiated, at step 62 a sample delay is provided to rebuild utilization information for analyzing the newly set utilization.

Although the present invention has been described in detail, it should be understood that various changes, substitutions and alterations can be made hereto without departing from the spirit and scope of the invention as defined by the appended claims.

What is claimed is:

1. A method for communicating between an information handling system and plural storage devices through a wide link having plural serial narrow links, each narrow link having first and second physical paths, the method comprising:

communicating information from the information handling to the storage devices through a wide link having plural serial narrow links, each narrow link having only first and second physical paths, the communicating information including communicating information on a first physical path of a first of the plural serial narrow links;

communicating information from the storage devices to the information handling system on a second physical path of the first of the plural serial narrow links;

monitoring utilization of the narrow links for communicating between the information handling systems and the storage devices;

detecting a predetermined relationship at the wide link between information communicated in a direction from the information handling system and information communicated in a direction from the storage devices, the predetermined relationship including at least the amount of data sent in the direction from the information handling system and the amount of data sent in the direction from the storage devices;

in response to the detecting, reversing the direction of information at one of the first physical path or second physical path of the first of the plural serial narrow links while maintaining the direction of information on the other of the first physical path or second physical path so that information communicates in the same direction on both the first and second physical paths;

identifying a serial narrow link having all information communicated in one direction; and providing control for the identified serial narrow link though another of the serial narrow links concurrent with having the information communicated in one direction.

2. The method of claim 1 wherein the wide link comprises a Serial Attached SCSI (SAS) expander block.

3. The method of claim 2 wherein the host information handling system comprises a Redundant Array of Independent Disks (RAID) controller and the storage devices comprise solid state drives.

4. The method of claim 2 wherein the host information handling system comprises a RAID controller and the storage devices comprise hard disk drives.

5. The method of claim 1 wherein the predetermined relationship comprises a ratio of information communicated in a direction from the information handling and information communicated in a direction from the storage devices.

6. The method of claim 1 wherein the predetermined relationship comprises the number of narrow links having greater than a predetermined utilization in one of the directions.

7. The method of claim 1 wherein the predetermined relationship comprises the number of narrow links having less than a predetermined utilization in one of the directions.

8. An information handling system comprising:
processing components operable to process information;
a storage controller interfaced with the processing components and configured to communicate through a wide link with a storage enclosure, the wide link having plural serial narrow links, each narrow link having only two paths;
a storage enclosure having plural storage devices configured to store information;
a wide link interfacing the storage controller and storage enclosure, the wide link having plural narrow serial links, each narrow link having an upstream path that communicates information from the storage enclosure to the information handling system and a downstream path that communicates information from the information handling system to the storage enclosure;
an enclosure manager operable to manage communication through the wide link; and
a bi-directional link manager configured to selectively reverse the direction of information for one or more of the upstream or downstream paths based upon the amount of data sent through the upstream path compared with the amount of data sent through the downstream path, the reversing direction of information resulting in a narrow link having both paths of that narrow link sending information in the same direction, the bi-directional link manager providing control for the narrow link having both paths sending information in the same direction by concurrently communicating control information for the narrow link through a different of the narrow serial links.

9. The information handling system of claim 8 wherein the wide link comprises an SAS expander block.

10. The information handling system of claim 9 wherein the storage enclosure comprises plural hard disk drivers.

11. The information handling system of claim 9 wherein the storage enclosure comprises plural solid state drives.

12. The information handling system of claim 8 further comprising a link load analyzer interfaced with the bi-directional link manager and operable to analyze information passing through the wide link to determine if a predetermined threshold exists for reversing an upstream or downstream path.

13. The information handling system of claim 12 wherein the threshold comprises utilization of a narrow link at a predetermined upper level.

14. The information handling system of claim 12 wherein the threshold comprises utilization of a narrow link at a predetermined lower level.

15. The information handling system of claim 8 further comprising a master link manager operable to assign a downstream path of a narrow link to support plural upstream paths of a different of the narrow links.

16. The information handling system of claim 8 further comprising a master link manager operable to assign an upstream path of a narrow link to support plural downstream paths of a different of the narrow links.

17. A storage enclosure link comprising:
a wide link having plural narrow serial links, each narrow serial link having only a first physical path and a second physical path;
an expander block operable to selectively interface each of plural storage devices with an information handling system through a selected of the first and second physical paths; and
a bi-directional link manager interfaced with the expander block and operable to selectively configure both a first and second physical path of a narrow serial link to reverse communication of information on one physical path so that both physical paths communicate information in the same direction, the reversing of communication based upon the amount of information sent in each direction by the plural narrow serial links, the bi-directional link manager providing control for a narrow link having information sent in the same direction on the first and second physical paths by simultaneously communicating control information through another of the narrow serial links.

18. The storage enclosure of claim 17 further comprising a link load analyzer operable to monitor information communicated over the plural narrow links to detect a predetermined condition for configuring the first and second path to communicate in the same direction.

19. The storage enclosure of claim 18 further comprising a master link manager operable to configure a narrow link to manage communication of information through the first and second path that communicate in the same direction.

* * * * *